United States Patent
Zeng

(10) Patent No.: US 9,971,086 B2
(45) Date of Patent: May 15, 2018

(54) BACKLIGHT MODULE AND LIQUID CRYSTAL DISPLAY

(71) Applicant: WUHAN CHINA STAR OPTOELECTRONICS TECHNOLOGY CO., LTD., Wuhan, Hubei (CN)

(72) Inventor: Jie Zeng, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 43 days.

(21) Appl. No.: 15/307,266

(22) PCT Filed: May 23, 2016

(86) PCT No.: PCT/CN2016/082949
§ 371 (c)(1),
(2) Date: Oct. 27, 2016

(87) PCT Pub. No.: WO2017/148017
PCT Pub. Date: Sep. 8, 2017

(65) Prior Publication Data
US 2018/0106959 A1    Apr. 19, 2018

(30) Foreign Application Priority Data
Mar. 3, 2016    (CN) .......................... 2016 1 0120983

(51) Int. Cl.
*F21V 8/00*    (2006.01)

(52) U.S. Cl.
CPC ........... *G02B 6/0088* (2013.01); *G02B 6/009* (2013.01); *G02B 6/0051* (2013.01); *G02B 6/0053* (2013.01); *G02B 6/0055* (2013.01); *G02B 6/0065* (2013.01); *G02B 6/0073* (2013.01)

(58) Field of Classification Search
CPC .. G02B 6/0088; G02B 6/0051; G02B 6/0053; G02B 6/0055; G02B 6/0065; G02B 6/0073; G02B 6/009; G02B 6/005; G02B 6/0086; G02F 1/133308; G02F 1/133602; G02F 1/133615; G02F 2001/133325; G02F 1/133606
See application file for complete search history.

(56) References Cited

U.S. PATENT DOCUMENTS

| | | | |
|---|---|---|---|
| 2012/0169963 A1* | 7/2012 | Park ................. | G02F 1/133308 349/62 |
| 2016/0246117 A1* | 8/2016 | Guo .................. | G02F 1/133606 |
| 2017/0139098 A1* | 5/2017 | Zeng ..................... | G02B 6/005 |

* cited by examiner

Primary Examiner — Bao Q Truong
(74) Attorney, Agent, or Firm — Muncy, Geissler, Olds & Lowe, P.C.

(57) ABSTRACT

A backlight module and a liquid crystal display are provided. In the backlight module, a reflection sheet and a first optical film set are designed as an up-down engaged box structure, wherein the other elements of the backlight module are fixed inside the box, so as to form the whole of the backlight module. The backlight module has advantages: narrow frame, simple structure, low cost, high light utilization efficiency. The liquid crystal display has advantages such as a narrow frame.

14 Claims, 2 Drawing Sheets

BACKLIGHT MODULE AND LIQUID CRYSTAL DISPLAY

This application claims priority of Chinese Patent Application No. 201610120983.1, "Backlight module and liquid crystal display", filed on Mar. 3, 2016, which is hereby incorporated by reference in its entirety.

FIELD OF THE INVENTION

The present invention relates to a technical field of liquid crystal displays, and more particularly to a backlight module and a liquid crystal display.

BACKGROUND OF THE INVENTION

Liquid crystal display devices are widely used in various electronic products, and a requirement of a narrow frame design for the electric products is increased, so that as an important element of the liquid crystal display device, a backlight module gradually tends to a narrow frame design therewith.

Refer now to FIG. 1, which is a schematic structural view of a traditional backlight module. The structure of the traditional backlight module comprises a plastic frame 11, an LED light source 12, a flexible print circuit (FPC) 13, a light guide plate 14, an optical film set 15, a reflection sheet 16, and double-sided tapes 17. Because the plastic frame 11 has a certain thickness, the width of the backlight module is increased, and whole of the width of the liquid crystal display device is increased, too. Therefore, the narrow frame design required by the market cannot be satisfied. Furthermore, since the plastic frame is disposed inside the traditional backlight module, the structure of whole of the backlight module is more complex, causing the manufacturing cost to be correspondingly increased, and a light leaked from side surfaces of the light guide plate 14 cannot be reflected back to the light guide plate, causing a problem that the light utilization efficiency is low.

Hence, it is necessary to provide a backlight module with a narrow frame, by which the width of the backlight module is decreased, so as to satisfy the market requirement of narrow frame design, and the structure of the backlight module can be simplified, so as to lower the cost. Simultaneously, the light leaked from side surfaces of the light guide plate can be reflected back to the light guide plate, so as to increase the light utilization efficiency.

SUMMARY OF THE INVENTION

An embodiment of the present invention provides a backlight module, so as to solve a problem: a traditional backlight module frame is too wide. An embodiment of the present invention further provides a liquid crystal display, so as to solve a problem: in a traditional technology, because a liquid crystal display frame is too wide, a viewed image is smaller in the same screen size.

An embodiment of the present invention provides a liquid crystal display, which comprises a backlight module, wherein the backlight module comprises: an LED light source, a flexible print circuit, a light guide plate, an optical film set, and a reflection sheet, wherein the optical film set includes a first optical film set and a second optical film set; wherein the reflection sheet is composed of a bottom surface and four laterals, and the bottom surface and four of the laterals are folded as a box;

the LED light source is disposed on the bottom surface of the reflection sheet, and three laterals, which are non-light-output sides, of the LED light source contact with three of the laterals of the reflection sheet, respectively;

the light guide plate is disposed on the bottom surface of the reflection sheet, and a light-input side of the light guide plate corresponds to a light-output sides of the LED light source, and three non-light-output side surfaces of the light guide plate contact with three of the laterals of the reflection sheet;

the flexible print circuit is disposed above the LED light source, and adhered and fixed with an inner surface of the first optical film set by a double-sided tape;

the second optical film set is disposed on a light-output side of the light guide plate, and three side surfaces of the second optical film set which do not correspond to the flexible print circuit contact with three of the laterals of the reflection sheet; and the first optical film set is composed of a top surface and four laterals, wherein the top surface of the first optical film set is disposed on the flexible print circuit and the second optical film set, and inner surfaces of four of the laterals of the first optical film set are adhered and fixed with outer surfaces of the laterals of the reflection sheet by double-sided tapes.

In the liquid crystal display of the present invention, an optical film in the first optical film set is a first prism sheet; and the second optical film set include a second prism sheet and a diffusion sheet, and the diffusion sheet is disposed between the second prism sheet and the light guide plate.

In the liquid crystal display of the present invention, in the second optical film set, the number of optical films is two.

In the liquid crystal display of the present invention, the flexible print circuit includes an outer interface, which is led out through an opening on the laterals of the first optical film set.

An embodiment of the present invention further provides a backlight module, which comprises: an LED light source, a flexible print circuit, a light guide plate, an optical film set, and a reflection sheet, wherein the optical film set includes a first optical film set and a second optical film set;

wherein the reflection sheet is composed of a bottom surface and four laterals, and the bottom surface and four of the laterals are folded as a box;

the LED light source is disposed on the bottom surface of the reflection sheet, and three laterals, which are non-light-output sides, of the LED light source contact with three of the laterals of the reflection sheet, respectively;

the light guide plate is disposed on the bottom surface of the reflection sheet, and a light-input side of the light guide plate corresponds to a light-output sides of the LED light source, and three non-light-output side surfaces of the light guide plate contact with three of the laterals of the reflection sheet;

the flexible print circuit is disposed above the LED light source, and attached and fixed with an inner surface of the first optical film set;

the second optical film set is disposed on a light-output side of the light guide plate, and three side surfaces of the second optical film set which do not correspond to the flexible print circuit contact with three of the laterals of the reflection sheet; and the first optical film set is composed of a top surface and four laterals, wherein the top surface of the first optical film set is disposed on the flexible print circuit and the second optical film set, and inner surfaces of four of the laterals of the first optical film set are attached and fixed with outer surfaces of the laterals of the reflection sheet.

In the backlight module of the present invention, methods of attaching and fixing include adopting a double-sided tape and a hot-melt adhesive.

In the backlight module of the present invention, an optical film in the first optical film set is a first prism sheet.

In the backlight module of the present invention, in the second optical film set, the number of optical films is two.

In the backlight module of the present invention, the second optical film set include a second prism sheet and a diffusion sheet, and the diffusion sheet is disposed between the second prism sheet and the light guide plate.

In the backlight module of the present invention, the flexible print circuit includes an outer interface, which is led out through an opening on the laterals of the first optical film set.

An embodiment of the present invention further provides a liquid crystal display, which comprises a backlight module, wherein the backlight module, comprises: an LED light source, a flexible print circuit, a light guide plate, an optical film set, and a reflection sheet, wherein the optical film set includes a first optical film set and a second optical film set; wherein the reflection sheet is composed of a bottom surface and four laterals, and the bottom surface and four of the laterals are folded as a box;
the LED light source is disposed on the bottom surface of the reflection sheet, and three laterals, which are non-light-output sides, of the LED light source contact with three of the laterals of the reflection sheet, respectively;
the light guide plate is disposed on the bottom surface of the reflection sheet, and a light-input side of the light guide plate corresponds to a light-output sides of the LED light source, and three non-light-output side surfaces of the light guide plate contact with three of the laterals of the reflection sheet;
the flexible print circuit is disposed above the LED light source, and attached and fixed with an inner surface of the first optical film set;
the second optical film set is disposed on a light-output side of the light guide plate, and three side surfaces of the second optical film set which do not correspond to the flexible print circuit contact with three of the laterals of the reflection sheet; and
the first optical film set is composed of a top surface and four laterals, wherein the top surface of the first optical film set is disposed on the flexible print circuit and the second optical film set, and inner surfaces of four of the laterals of the first optical film set are attached and fixed with outer surfaces of the laterals of the reflection sheet.

In the liquid crystal display of the present invention, an optical film in the first optical film set is a first prism sheet; and the second optical film set include a second prism sheet and a diffusion sheet, and the diffusion sheet is disposed between the second prism sheet and the light guide plate.

In the liquid crystal display of the present invention, in the second optical film set, the number of optical films is two.

In the liquid crystal display of the present invention, the flexible print circuit includes an outer interface, which is led out through an opening on the laterals of the first optical film set.

Compared with the traditional technology, the preferred embodiment of the present invention provides a backlight module, in which a reflection sheet and a first optical film set are designed as an up-down engaged box structure, wherein the LED light source, the light guide plate, and other elements are fixed inside the box, so as to form the whole of the backlight module. Because the backlight module omits a plastic frame of the traditional technology, the frame of the backlight module is narrowed, so that the structure of the backlight module is simplified, and the cost is lowered. Additionally, because the laterals of the reflection sheet contact with the light guide plate, a light leaked from side surfaces of the light guide plate can be reflected back to the light guide plate, so as to increase the light utilization efficiency of the backlight module, and increase the brightness of the backlight.

The preferred embodiment of the present invention further provides a liquid crystal display, by adopting backlight module provided by the present invention, the frame of the liquid crystal display can be narrowed, so that in the same size of the screen, the displayed image is bigger, and the effect is better, so that the narrow frame design required by the market can be satisfied. Simultaneously, the liquid crystal display has advantages: low manufacturing cost, high light utilization efficiency, and high brightness of the backlight.

DETAILED DESCRIPTION OF THE PREFERRED EMBODIMENTS

In order to more clearly illustrate technical solutions of embodiments or in the prior art, accompany drawings which need to be used in the description of the embodiments or the prior art will be simply introduced. Obviously, the accompany drawings in the following description are merely some embodiments, and for those of ordinary skill in the art, other embodiments can further be obtained according to these accompany drawings without contributing any creative work.

Figure 2:
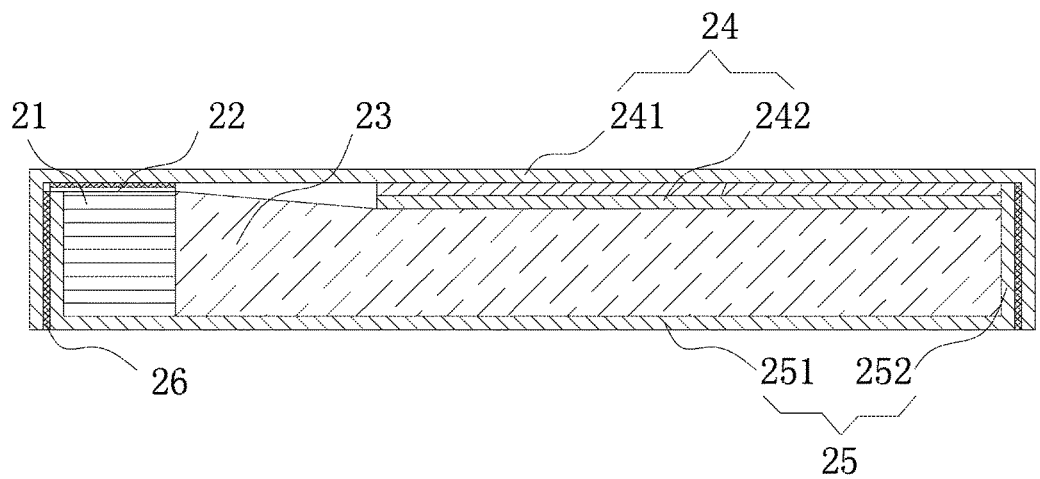
FIG. 2 is a cross-sectional schematic view of a backlight module according to the present invention.

Refer now to FIG. 2, which is a cross-sectional schematic view of a backlight module according to the present invention. A preferred embodiment of the present invention provides a backlight module, which comprises: an LED light source 21, a flexible print circuit 22, a light guide plate 23, an optical film set 24, and a reflection sheet 25, wherein the optical film set 24 includes a first optical film set 241 and a second optical film set 242.

The reflection sheet 25 is composed of a bottom surface 251 and four laterals 252, wherein the bottom surface 251 and four of the laterals 252 are folded as a box, and the box is configured to provide a containing space for other elements of the backlight module.

The LED light source 21 is disposed on the bottom surface 251 of the reflection sheet 25, wherein three laterals, which are non-light-output sides, of the LED light source 21 contact with three of the laterals 252 of the reflection sheet, respectively, so that the LED light source 21 can be fixed by the box formed by the reflection sheet 25.

Figure 1:
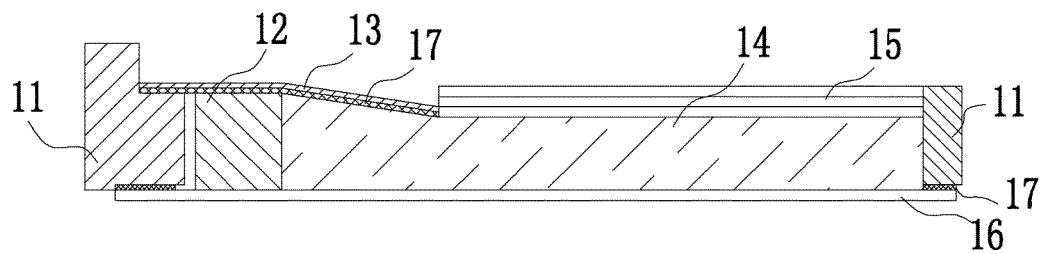
FIG. 1 is a schematic structural view of a traditional backlight module.

The flexible print circuit 22 is disposed above the LED light source 21, and it is attached and fixed with an inner surface of the first optical film set 241. In a traditional technology, refer to FIG. 1, a flexible print circuit 13 is fixed on the plastic frame 11 and a light guide plate 14 by a double-sided tape 17, and the flexible print circuit 13 is exposed in outside. When the backlight module is transported, sealed, or installed into a liquid crystal display device, the flexible print circuit 13 is easily damaged, and needs to be changed, which wastes materials, and also wastes human resources. However, in the preferred embodiment of the present invention, the flexible print circuit 22 in FIG. 2 is attached on the inner surface of the first optical film set 241, namely the flexible print circuit 22 is packaged inside the backlight module, so that it has an effect of fixing the flexible print circuit 22, as well as preventing the flexible print circuit 22 from damage. Furthermore, the practicability of the preferred embodiment of the present invention is increased.

The light guide plate 23 is disposed on the bottom surface 251 of the reflection sheet 25, wherein a light-input side of the light guide plate 23 corresponds to a light-output sides of the LED light source 21, and three non-light-output side surfaces of the light guide plate 23 contact with three of the laterals 252 of the reflection sheet, so that the light guide plate 23 can be fixed by the box formed by the reflection sheet 25.

The second optical film set 242 is disposed on a light-output side of the light guide plate 23, wherein three side surfaces of the second optical film set 242 which do not correspond to the flexible print circuit 22 contact with three of the laterals 252 of the reflection sheet, so that the second optical film set 242 is fixed by contacting with the laterals 252 of the reflection sheet.

The first optical film set 241 is composed of a top surface and four laterals, wherein the top surface of the first optical film set 241 is disposed on the flexible print circuit 22 and the second optical film set 242, and inner surfaces of four of the laterals of the first optical film set 241 are attached and fixed with outer surfaces of the laterals 252 of the reflection sheet 25. By that the inner surfaces of four of the laterals of the first optical film set 241 are attached and fixed with the outer surfaces of the laterals 252 of the reflection sheet, the LED light source 21, the flexible print circuit 22, the light guide plate 23, and the second optical film set 242, which are disposed inside the reflection sheet 25, are fixed inside an up-down engaged box structure composed of the reflection sheet 25 and the first optical film set 241, so that the whole of the backlight module is formed.

In the preferred embodiment, the laterals 252 of the reflection sheet 25 are disposed on the inner surfaces of the first optical film set 241, namely the laterals 252 of the reflection sheet 25 contact with the light guide plate 23, so that a light leaked from side surfaces of the light guide plate 23 can be reflected back to the light guide plate 23, so as to increase the light utilization efficiency of the backlight module.

In the preferred embodiment, because the attached places of the reflection sheet 25 and the first optical film set 241 are on the side surfaces of the light guide plate 23, compared with the traditional technology, the backlight module of the preferred embodiment has a flatter bottom portion, so that the backlight module is not easily slanted and the output light therefrom is more uniform when the backlight module is attached to a display screen. Simultaneously, because the reflection sheet 25 is attached and fixed with the laterals of the first optical film set 241, the side surfaces of the backlight module has at least two structure layers, namely the laterals 252 of the reflection sheet 25 and the laterals of the first optical film set 241, so as to increase the mechanical strength of the backlight module.

Figure 3:
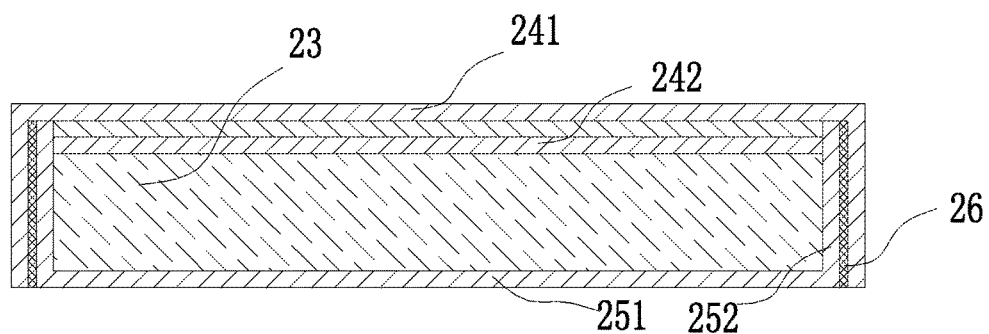
FIG. 3 is a cross-sectional schematic view of the backlight module in a light guide plate side according to the present invention.

Because FIG. 2 only shows left and right sides of each element, for better understanding the structure of the backlight module of the preferred embodiment, a cross-sectional schematic view of the backlight module in a light guide plate side is provided. Refer now to FIG. 3, which shows another two sides of each element in FIG. 2, namely a front side and a rear side of the reflection sheet 25, the optical film set 24, and the light guide plate 23. Combining FIG. 2 and FIG. 3, the structure of the backlight module in the preferred embodiment can be easily understood by a person skilled in the art.

Figure 4:
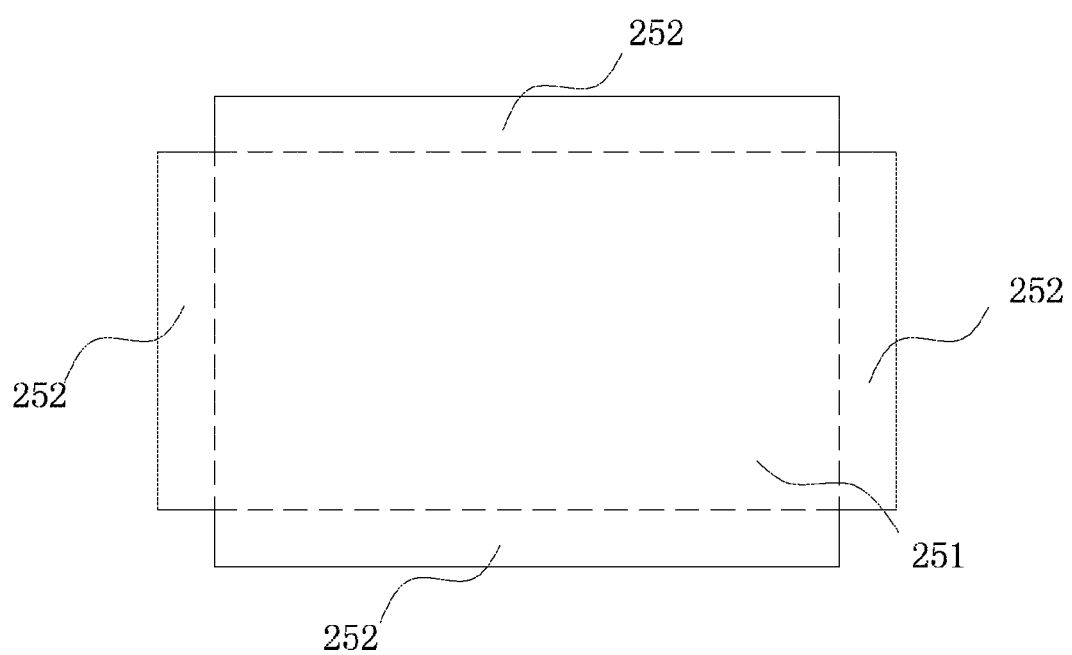
FIG. 4 is a profile schematic view of an unfolded reflection sheet of the backlight module according to the present invention.

For further understanding the shape and structure of the reflection sheet 25 of the backlight module in the preferred embodiment, a profile schematic view of an unfolded reflection sheet of the backlight module is provided. Refer now to FIG. 4, when processing an assembly of the backlight module, the reflection sheet 25 is bent along dotted lines in FIG. 4, and four of the laterals 252 are stood up, combined with the bottom surface, to form a box. It should be noted that the shape and structure of the first optical film set 241 is similar to that of the reflection sheet 25, and can be easily understood by a person skilled in the art, so there is no further description here.

In the preferred embodiment, the flexible print circuit 22 includes an outer interface, which is configured to be connected with an external electric power, so that a voltage is provided from outside. The outer interface can be led out through an opening on the laterals of the first optical film set 241. However, in other embodiments, the outer interface can be led out through other locations of the backlight module, and they are not particularly limited here.

In the preferred embodiment, the attaching and fixing method is adopted with a method of adhering and fixing by double-sided tapes 26, but in other embodiments, a hot-melting and fixing method can also be used, and they are not particularly limited here.

In the preferred embodiment, optical films in the first optical film set 241 is a first prism sheet, but in other embodiments, it can be a diffusion sheet, and this is not particularly limited here.

In the preferred embodiment, the number of optical films in the second optical film set 242 is two, a second prism sheet and a diffusion sheet, respectively, wherein the diffusion sheet is disposed between the second prism sheet and the light guide plate 23. In other embodiments, the second optical film set 242 can be installed more layers of the optical films, and they are not particularly limited here.

The preferred embodiment provides a backlight module, in which a reflection sheet 25 and a first optical film set 241 are designed as an up-down engaged box structure, wherein the LED light source 21, the light guide plate 23, and other elements are fixed inside the box, so as to form the whole of the backlight module. Because the backlight module omits a plastic frame of the traditional technology, the frame of the backlight module is narrowed, so that the structure of the backlight module is simplified, and the cost is lowered. Additionally, because the laterals 252 of the reflection sheet 25 contact with the light guide plate 23, a light leaked from side surfaces of the light guide plate 23 can be reflected back to the light guide plate 23, so as to increase the light utilization efficiency of the backlight module.

In order to more clearly describe the structure of the backlight module of preferred embodiment, the assembly process of the backlight module is described as follows: putting the reflection sheet 25 on a flat work platform; putting the LED light source 21 and the light guide plate 23 on the bottom surface 251 of the reflection sheet 25, wherein the light-output side of the LED light source 21 corresponds to the light-input side of the light guide plate 23;

putting the second optical film set 242 on the light-output side of the light guide plate 23, wherein three of the side surfaces of the second optical film set 242 and three of the side surfaces of the light guide plate 23 are aligned, to "the right" (here "the right" is a direction from the LED light source 21 to the light guide plate 23);

standing up the laterals 252 of the reflection sheet 25, wherein the corresponding side surfaces of the LED light source 21 and the light guide plate 23 are contacted;

attaching the flexible print circuit 22 on the inner surface of the first optical film set 241, wherein the flexible print circuit 22 should be ensured to be disposed above the LED light source 21 when the first optical film set 241 cover on the box formed by the reflection sheet 25; and adhering the double-sided tape 26 on the inner surface of the laterals of the first optical film set 241; covering the box with the first optical film set 241; putting down four of the laterals of the first optical film set 241 in order; and adhering and fixing the laterals of the first optical film set 241 with outer surfaces of the laterals 252 of the reflection sheet 25.

The above-mentioned method is one of the assembly methods of the backlight module, but in other embodiments, the other assembly methods can be adopted to assemble the backlight module, so in the preferred embodiment, the particular assembly method is not limited here.

The preferred embodiment further provides a liquid crystal display, which comprises a backlight module, wherein the backlight module comprises: an LED light source, a flexible print circuit, a light guide plate, an optical film set, and a reflection sheet, wherein the optical film set includes a first optical film set and a second optical film set.

The reflection sheet is composed of a bottom surface and four laterals, wherein the bottom surface and four of the laterals are folded as a box, and the box is configured to provide a containing space for other elements of the backlight module.

The LED light source is disposed on the bottom surface of the reflection sheet, wherein three laterals, which are non-light-output sides, of the LED light source contact with three of the laterals of the reflection sheet, respectively, so that the LED light source can be fixed by the box formed by the reflection sheet.

The flexible print circuit is disposed above the LED light source, and it is attached and fixed with an inner surface of the first optical film set. In a traditional technology, refer to FIG. 1, a flexible print circuit is fixed on the plastic frame and a light guide plate by a double-sided tape, and the flexible print circuit is exposed in outside. When the backlight module is transported, sealed, or installed into a liquid crystal display device, the flexible print circuit is easily damaged, and needs to be changed, witch wastes materials, and also wastes human resources.

However, in the preferred embodiment of the present invention, the flexible print circuit is attached on the inner surface of the first optical film set, so that it can prevent the flexible print circuit from damage. Furthermore, the practicability of the preferred embodiment of the present invention is increased.

The light guide plate is disposed on the bottom surface of the reflection sheet, wherein a light-input side of the light guide plate corresponds to a light-output sides of the LED light source, and three non-light-output side surfaces of the light guide plate contact with three of the laterals of the reflection sheet, so that the light guide plate can be fixed by the box formed by the reflection sheet.

The second optical film set is disposed on a light-output side of the light guide plate, wherein three side surfaces of the second optical film set which do not correspond to the flexible print circuit contact with three of the laterals of the reflection sheet, so that the second optical film set is fixed by contacting with the laterals of the reflection sheet.

The first optical film set is composed of a top surface and four laterals, wherein the top surface of the first optical film set is disposed on the flexible print circuit and the second optical film set, and inner surfaces of four of the laterals of the first optical film set are attached and fixed with outer surfaces of the laterals of the reflection sheet. By that the inner surfaces of four of the laterals of the first optical film set are attached and fixed with the outer surfaces of the laterals of the reflection sheet, the LED light source, the flexible print circuit, the light guide plate, and the second optical film set, which are disposed inside the reflection sheet, are fixed inside an up-down engaged box structure composed of the reflection sheet and the first optical film set, so that the whole of the backlight module is formed.

In the preferred embodiment, the flexible print circuit includes an outer interface, which is configured to be connected with an external electric power, so that a voltage is provided from outside. The outer interface can be led out through an opening on the laterals of the first optical film set. However, in other embodiments, the outer interface can be led out through other locations of the backlight module, and they are not particularly limited here.

In the preferred embodiment, the attached and fixed method is adopted with a method of adhered and fixed by double-sided tapes, but in other embodiments, a hot-melting and fixing method can also be used, and they are not particularly limited here.

In the preferred embodiment, optical films in the first optical film set is a first prism sheet, but in other embodiments, it can be a diffusion sheet, and this is not particularly limited here.

In the preferred embodiment, the number of optical films in the second optical film set is two, a second prism sheet and a diffusion sheet, respectively, wherein the diffusion sheet is disposed between the second prism sheet and the light guide plate. In other embodiments, the second optical film set can be installed more layers of the optical films, and they are not particularly limited here.

The preferred embodiment of the present invention further provides a liquid crystal display, by adopting the backlight module provided by the present invention, the frame of the liquid crystal display can be narrowed, so that in the same size of the screen, the displayed image is bigger, and the effect is better, so that the narrow frame design required by the market can be satisfied. Simultaneously, the liquid crystal display has advantages: low manufacturing cost, high light utilization efficiency, and high brightness of the backlight.

The present invention has been described with preferred embodiments thereof and it is understood that many changes and modifications to the described embodiment can be carried out without departing from the scope and the spirit of the invention that is intended to be limited only by the appended claims.

What is claimed is:

1. A liquid crystal display, comprising a backlight module, wherein the backlight module, comprises: an LED light source, a flexible print circuit, a light guide plate, an optical film set, and a reflection sheet, wherein the optical film set includes a first optical film set and a second optical film set;

wherein the reflection sheet is composed of a bottom surface and four laterals, and the bottom surface and four of the laterals are folded as a box;

the LED light source is disposed on the bottom surface of the reflection sheet, and three laterals, which are non-light-output sides, of the LED light source contact with three of the laterals of the reflection sheet, respectively;

the light guide plate is disposed on the bottom surface of the reflection sheet, and a light-input side of the light guide plate corresponds to a light-output sides of the LED light source, and three non-light-output side surfaces of the light guide plate contact with three of the laterals of the reflection sheet;

the flexible print circuit is disposed above the LED light source, and adhered and fixed with an inner surface of the first optical film set by a double-sided tape;

the second optical film set is disposed on a light-output side of the light guide plate, and three side surfaces of the second optical film set which do not correspond to the flexible print circuit contact with three of the laterals of the reflection sheet; and the first optical film set is composed of a top surface and four laterals, wherein the top surface of the first optical film set is disposed on the flexible print circuit and the second optical film set, and inner surfaces of four of the laterals of the first optical film set are adhered and fixed with outer surfaces of the laterals of the reflection sheet by double-sided tapes.

2. The liquid crystal display according to claim 1, wherein an optical film in the first optical film set is a first prism sheet; and the second optical film set include a second prism sheet and a diffusion sheet, and the diffusion sheet is disposed between the second prism sheet and the light guide plate.

3. The liquid crystal display according to claim 1, wherein in the second optical film set, the number of optical films is two.

4. The liquid crystal display according to claim 1, wherein the flexible print circuit includes an outer interface, which is led out through an opening on the laterals of the first optical film set.

5. A backlight module, comprising: an LED light source, a flexible print circuit, a light guide plate, an optical film set, and a reflection sheet, wherein the optical film set includes a first optical film set and a second optical film set;

wherein the reflection sheet is composed of a bottom surface and four laterals, and the bottom surface and four of the laterals are folded as a box;

the LED light source is disposed on the bottom surface of the reflection sheet, and three laterals, which are non-light-output sides, of the LED light source contact with three of the laterals of the reflection sheet, respectively;

the light guide plate is disposed on the bottom surface of the reflection sheet, and a light-input side of the light guide plate corresponds to a light-output sides of the LED light source, and three non-light-output side surfaces of the light guide plate contact with three of the laterals of the reflection sheet;

the flexible print circuit is disposed above the LED light source, and attached and fixed with an inner surface of the first optical film set;

the second optical film set is disposed on a light-output side of the light guide plate, and three side surfaces of the second optical film set which do not correspond to the flexible print circuit contact with three of the laterals of the reflection sheet; and the first optical film set is composed of a top surface and four laterals, wherein the top surface of the first optical film set is disposed on the flexible print circuit and the second optical film set, and inner surfaces of four of the laterals of the first optical film set are attached and fixed with outer surfaces of the laterals of the reflection sheet.

6. The backlight module according to claim 5, wherein methods of attaching and fixing include adopting a double-sided tape and a hot-melt adhesive.

7. The backlight module according to claim 5, wherein an optical film in the first optical film set is a first prism sheet.

8. The backlight module according to claim 5, wherein in the second optical film set, the number of optical films is two.

9. The backlight module according to claim 5, wherein the second optical film set include a second prism sheet and a diffusion sheet, and the diffusion sheet is disposed between the second prism sheet and the light guide plate.

10. The backlight module according to claim 5, wherein the flexible print circuit includes an outer interface, which is led out through an opening on the laterals of the first optical film set.

11. A liquid crystal display, comprising a backlight module, wherein the backlight module comprises: an LED light source, a flexible print circuit, a light guide plate, an optical film set, and a reflection sheet, wherein the optical film set includes a first optical film set and a second optical film set;

wherein the reflection sheet is composed of a bottom surface and four laterals, and the bottom surface and four of the laterals are folded as a box;

the LED light source is disposed on the bottom surface of the reflection sheet, and three laterals, which are non-light-output sides, of the LED light source contact with three of the laterals of the reflection sheet, respectively;

the light guide plate is disposed on the bottom surface of the reflection sheet, and a light-input side of the light guide plate corresponds to a light-output sides of the LED light source, and three non-light-output side surfaces of the light guide plate contact with three of the laterals of the reflection sheet;

the flexible print circuit is disposed above the LED light source, and attached and fixed with an inner surface of the first optical film set;

the second optical film set is disposed on a light-output side of the light guide plate, and three side surfaces of the second optical film set which do not correspond to the flexible print circuit contact with three of the laterals of the reflection sheet; and the first optical film set is composed of a top surface and four laterals, wherein the top surface of the first optical film set is disposed on the flexible print circuit and the second optical film set, and inner surfaces of four of the laterals of the first optical film set are attached and fixed with outer surfaces of the laterals of the reflection sheet.

12. The liquid crystal display according to claim 11, wherein an optical film in the first optical film set is a first prism sheet; and the second optical film set include a second prism sheet and a diffusion sheet, and the diffusion sheet is disposed between the second prism sheet and the light guide plate.

13. The liquid crystal display according to claim 11, wherein in the second optical film set, the number of optical films is two.

14. The liquid crystal display according to claim 11, wherein the flexible print circuit includes an outer interface, which is led out through an opening on the laterals of the first optical film set.

* * * * *